United States Patent [19]

Jasper et al.

[11] Patent Number: 5,519,730
[45] Date of Patent: May 21, 1996

[54] COMMUNICATION SIGNAL HAVING A TIME DOMAIN PILOT COMPONENT

[76] Inventors: Steven C. Jasper, 4370 Haman Ct., Hoffman Estates, Ill. 60195; Mark A. Birchler, 472 Dee La., Roselle, Ill. 60172; James D. Solomon, 185 W. Brandon Ct. - Unit F, Palatine, Ill. 60067

[21] Appl. No.: 783,289

[22] Filed: Oct. 28, 1991

Related U.S. Application Data

[63] Continuation-in-part of Ser. No. 536,825, Jun. 12, 1990, abandoned.

[51] Int. Cl.⁶ .............................. H04L 27/28; H04L 1/04; H04J 1/08
[52] U.S. Cl. .................... 375/260; 375/261; 375/298; 375/340; 375/364; 370/74
[58] Field of Search .................. 375/38, 39, 40, 375/48, 58, 59, 111, 113, 94, 75, 260, 259, 261, 298, 275, 285, 295, 316, 340, 362, 364, 347; 370/110.2, 110.3, 110.4, 111, 98, 74, 110.1; 455/59, 52, 267; 332/103; 329/304, 348; 379/93

[56] References Cited

U.S. PATENT DOCUMENTS

| | | | |
|---|---|---|---|
| 3,290,440 | 12/1966 | Easton et al. | 370/98 |
| 3,341,776 | 9/1967 | Doelz et al. | 375/39 X |
| 3,404,229 | 10/1968 | Downey et al. | 455/63 |
| 3,550,003 | 12/1970 | Halsted | 375/38 |
| 3,708,751 | 1/1973 | Starr et al. | 375/17 |
| 4,110,562 | 8/1978 | Moed | 370/110.2 |
| 4,581,748 | 4/1986 | Sasaki et al. | 375/39 |
| 4,881,245 | 11/1989 | Walker et al. | 375/40 |
| 4,945,549 | 7/1990 | Simon et al. | 375/53 |
| 5,140,615 | 8/1992 | Jasper et al. | 375/347 |
| 5,170,413 | 12/1992 | Hess et al. | 375/40 |

*Primary Examiner*—Stephen Chin
*Assistant Examiner*—Tesfaldet Bocure

[57] ABSTRACT

A quad 16 QAM transmission and reception methodology wherein a time domain pilot reference is advantageously associated therewith. There may be one or more such pilot references for each packet of multiple 16 QAM pulses. Depending upon the embodiment, each 16 QAM pulse can include a time domain pilot reference, or an estimated pilot reference for that pulse can be determined either by reference to pilot references in other pulses sharing the same packet, or by reference to pilot references for other previously received 16 QAM pulses corresponding to that same pulse.

22 Claims, 5 Drawing Sheets

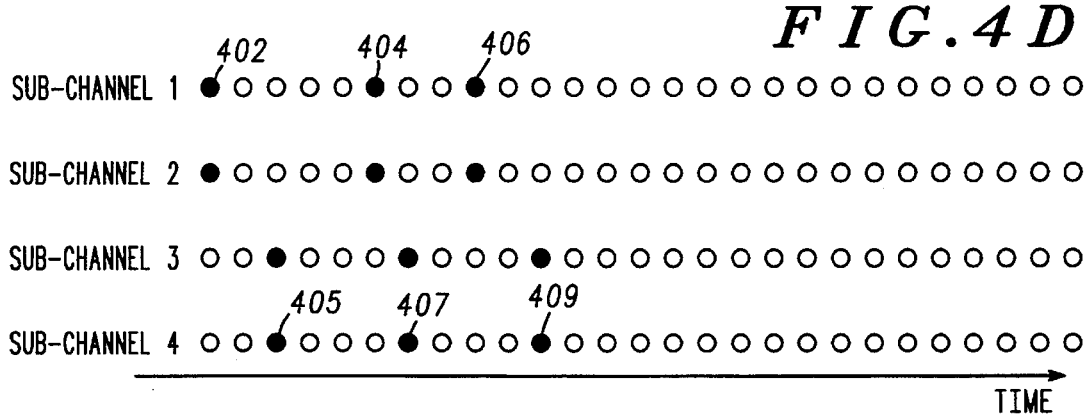
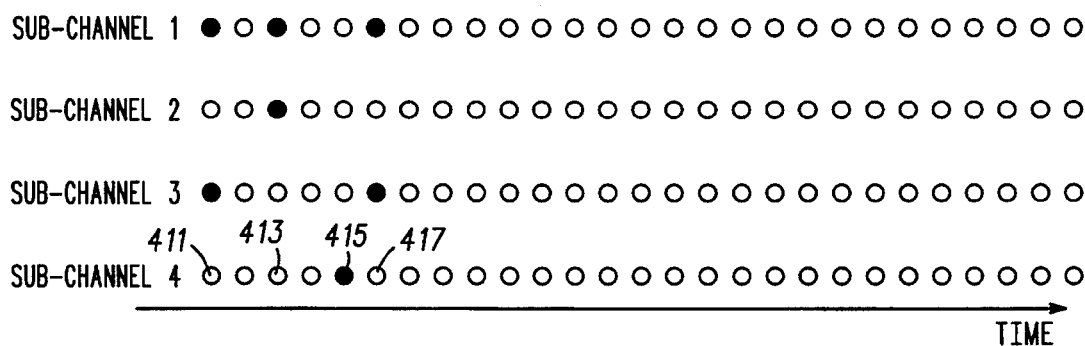
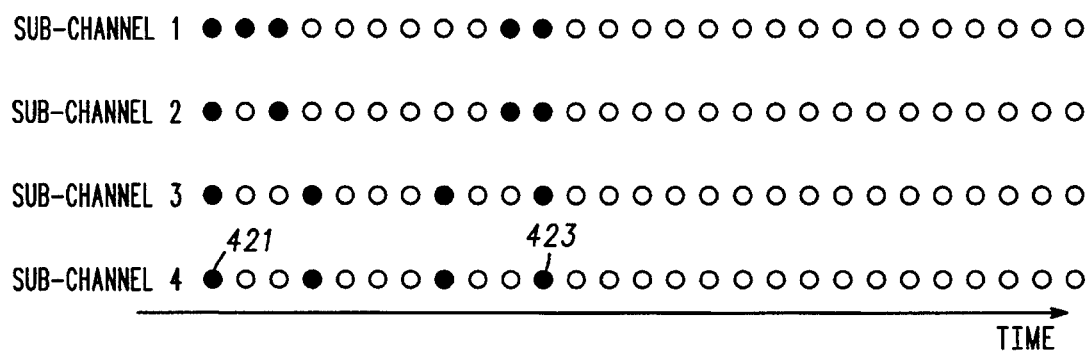
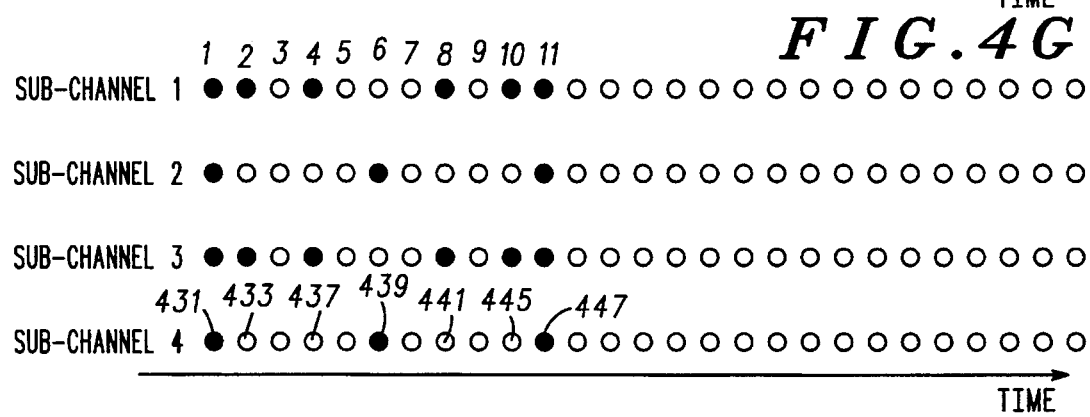

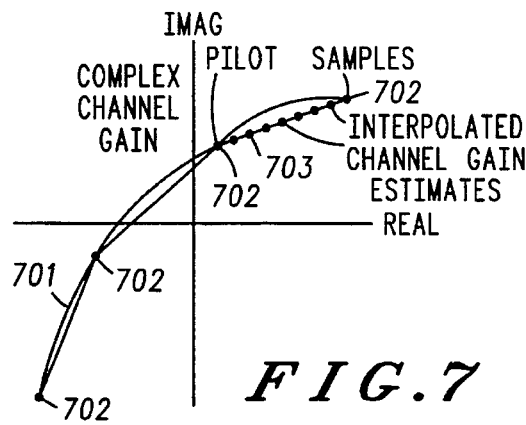
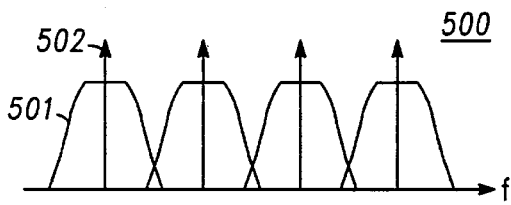
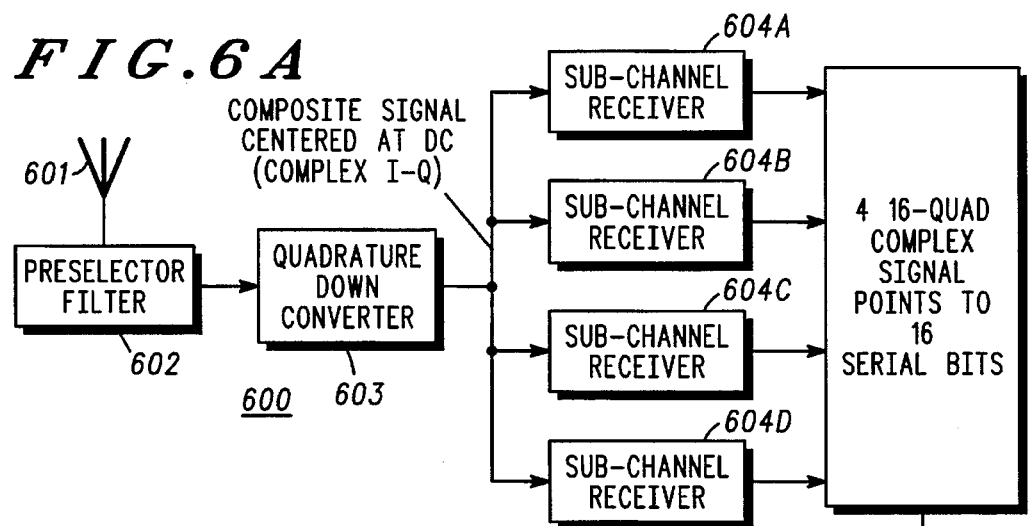
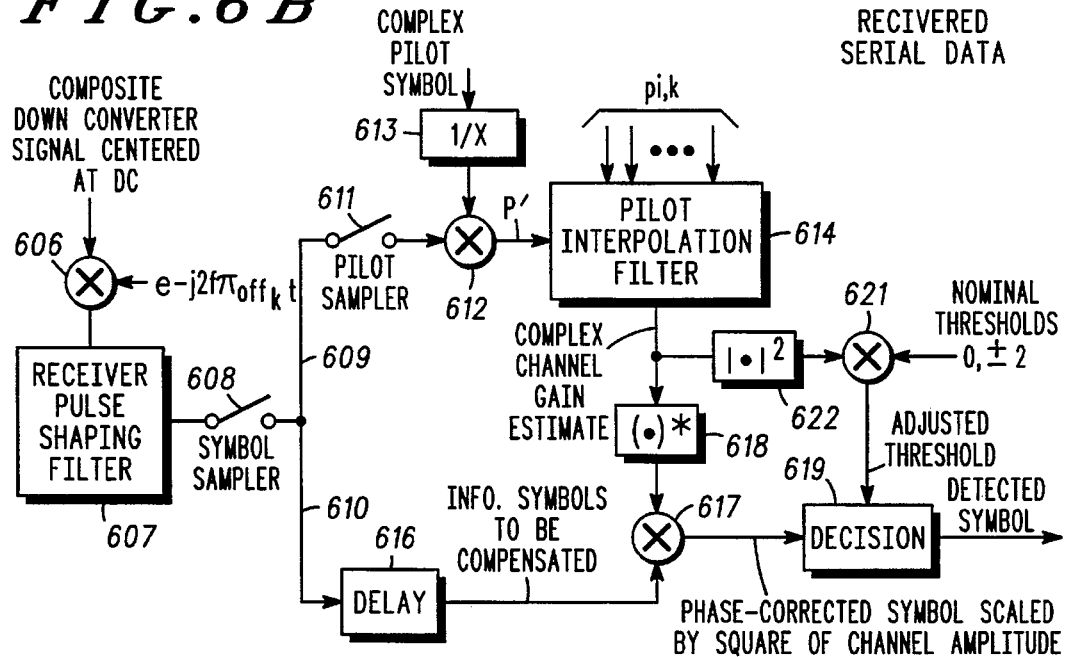

COMMUNICATION SIGNAL HAVING A TIME DOMAIN PILOT COMPONENT

This is a continuation-in-part of application Ser. No. 536,825, filed on Jun. 12, 1990, abandoned.

TECHNICAL FIELD

This invention relates generally to communication methodology, and more particularly to communication signals having information components that require the presence of a pilot component in order to facilitate recovery of the information components.

BACKGROUND OF THE INVENTION

Various communication systems are known in the art. Pursuant to many such systems, an information signal is modulated on to a carrier signal and transmitted from a first location to a second location. At the second location, the information signal is demodulated and recovered.

Typically, the communication path used by such a system has various limitations, such as bandwidth. As a result, there are upper practical limitations that restrict the quantity of information that can be supported by the communication path over a given period of time. Various modulation schemes have been proposed that effectively increase the information handling capacity of the communication path as measured against other modulation techniques. For example, a 16 point quadrature amplitude modulation (QAM) approach provides a constellation of modulation values (distinguished from one another by phase and amplitude) wherein each constellation point represents a plurality of information bits.

Such QAM signals are typically transmitted in conjunction with a pilot component. For example, the information components of the QAM signal can be broadcast in conjunction with one or more pilot tones that are offset in frequency from the information content itself. These pilot components can be utilized to support synchronization, and to otherwise support recovery of the information component in a variety of ways.

Unfortunately, such frequency offset pilot components themselves consume bandwidth, thereby reducing the amount of bandwidth available in a communication path to support the information components. If the information components are themselves parsed into frequency offset data packages, the problem increases as further spectrum must be utilized to support the multiplicity of pilot references that are typically required to allow recovery of the various information packets.

In partial response to this situation, the prior art has proposed the use of time domain pilot components. For example, the information components of a particular QAM transmission are combined with an in band predetermined pilot reference component that appears in a periodic manner. (Since the pilot component appears only from time to time, the component is referred to as existing in the time domain, as distinguished from the frequency domain pilot components discussed above.)

Though suitable for many applications, QAM transmissions that include time domain pilot components are not satisfactory in all applications. For example, in an RF communication environment, where communication units may be in motion with respect to one another, such prior art time domain pilot reference QAM methodologies may provide unacceptable performance. In particular, the land-mobile radio channel is characterized by multipath fading that causes the channel phase and amplitude to vary over time as the receiving or transmitting unit moves about. Such variations must be compensated or otherwise allowed for in order to provide proper reception. Typically, phase and frequency modulation schemes avoid the need for compensation since channel amplitude variations can be ignored and differential or discriminator reception techniques can automatically account for the channel phase variations. However, phase and frequency modulation are not very bandwidth efficient. While QAM techniques can introduce bandwidth efficiency by comparison, QAM requires more complicated channel compensation methods, such as those prior art techniques that use one or more pilot tones in association with the information content.

Another problem associated with the multipath nature of the radio channel is that of frequency-selective fading. This occurs whenever the delay difference between the various multipath components that arrive at the receiver become large enough relative to the signalling rate in the channel. When this happens, the channel's frequency response will no longer appear to be flat in the band of interest, but will exhibit phase and amplitude variations with frequency, which in turn will vary with time as the transmitter or receiver moves about. This frequency-selective effect causes signal distortion that is present independent of the strength of the received signal. In data communication systems, this distortion manifests itself as an irreducible bit error rate, or error floor, that persists regardless of how strong the received signal becomes. In addition, the distortion effect worsens as the information capacity of the signal increases.

Accordingly, a need exists for a communication methodology that will provide efficient use of QAM (and the like) modulation techniques while simultaneously substantially avoiding spectral inefficiencies that may occur through use of certain prior art pilot component techniques and other multipath compensation techniques. This technique will preferably remain substantially robust in a varying multipath operating environment.

SUMMARY OF THE INVENTION

These needs and others are substantially met through provision of the communication techniques disclosed herein. Pursuant to this invention, an original information signal is converted into a parallel plurality of processed information signal sample sequences. At least one of these sequences is then combined with a reference sequence containing at least one predetermined sample, which sample serves as a time domain pilot reference that a receiver utilizes to effectively recover a signal corresponding to the original information signal.

In one embodiment of the invention, the original information signal can be in the form of a serial data stream, and the conversion step operates upon preselected serial portions thereof.

In one embodiment of the invention, the conversion step further includes converting groups of bits that comprise the original information signal into corresponding multibit symbols. In a further embodiment, a predetermined plurality of these symbols constitutes a processed information signal sample sequence.

In one embodiment of the invention, the combining step includes combining the predetermined sample (which represents the time domain pilot reference) with at least two of the sample sequences. In another embodiment, all of the sequences are combined with a pilot tone reference in this manner.

In yet another embodiment, the time domain pilots can be provided in some, but not all, of a group of subchannels. To provide for channel compensation in the subchannels that do not have a pilot, the time domain pilots that are provided can be utilized to provide an estimation of a pilot for that subchannel. In effect, then, the occassionaly sent pilots can be utilized to interpolate both over time and over frequency to allow for channel compensation of the information signals.

BRIEF DESCRIPTION OF THE DRAWINGS

FIG. 5 comprises a spectral diagramatic representation of a plurality of sample sequences, each having been combined with a predetermined symbol, in accordance with the invention;

FIGS. 6a–b comprise block diagrams depicting a receiver suitable for use in receiving a signal in accordance with the invention; and FIG. 7 comprises a graph illustrating interpolated channel gains as determined in accordance with the invention;

BEST MODE FOR CARRYING OUT THE INVENTION

Figure 1:
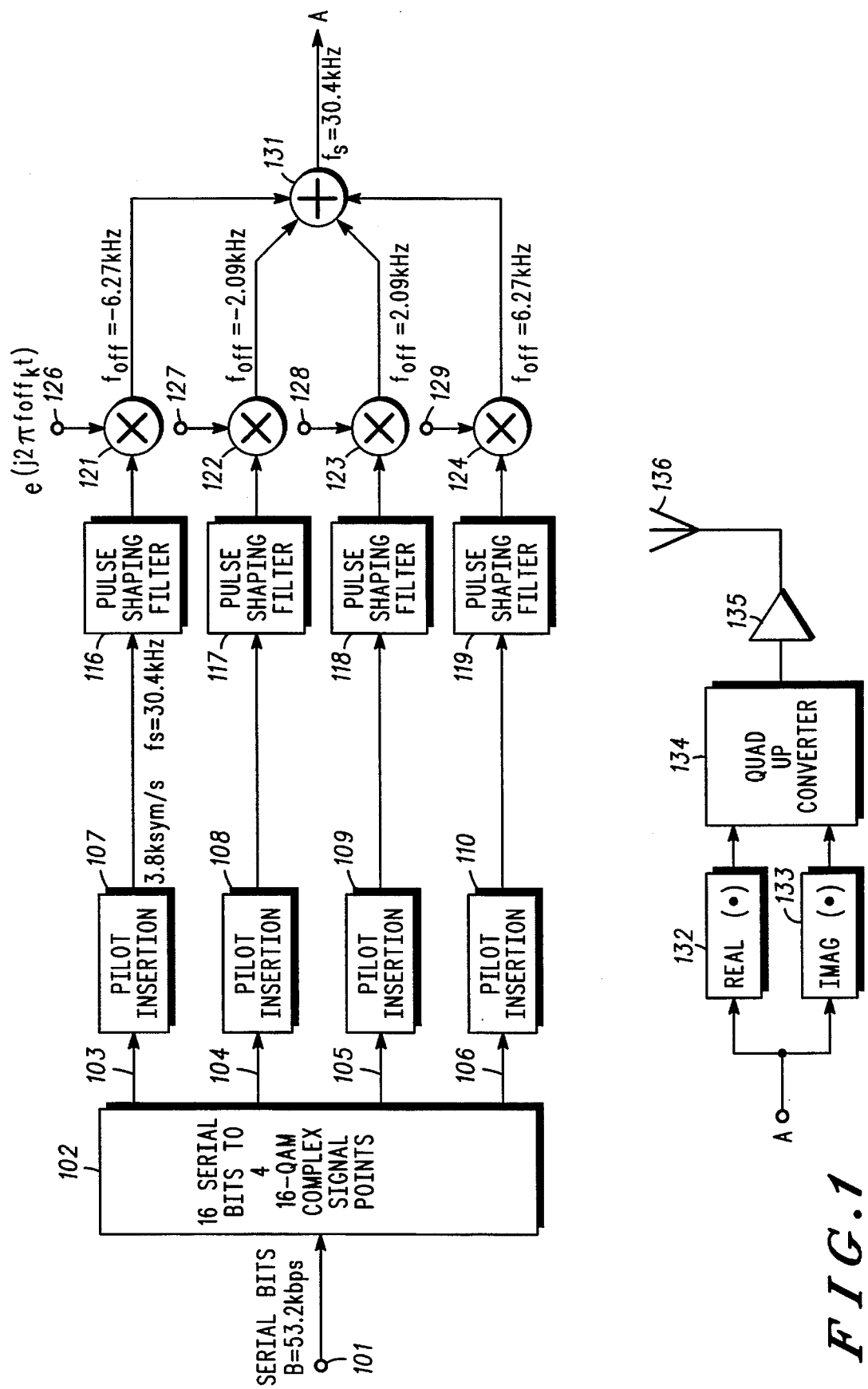
FIG. 1 comprises a block diagram depiction of a signal processor suitable for use in a transmitter in accordance with the invention.

A signal processor for preparing a signal for transmission in accordance with the invention is generally depicted in FIG. 1 by the reference numeral 100. Though depicted in block diagram format for the convenience of explanation and understanding, it should be understood that the invention can be practiced in a variety of embodiments; in particular, a digital signal processor, such as from the Motorola DSP 56000 or DSP 96000 families, is readily programmable to accomplish the functions set forth below. Also, although described below in the context of a 16#QAM application, it should also be understood that the teachings herein are also applicable for use with other modulation schemes as well.

A processing unit (102) receives an original information signal (101). In this particular embodiment, this information signal constitutes a serial bit stream having an effective baud rate of 53.2 kilobits per second. This bit stream can represent, for example, true data, digitized voice, or other appropriate signals. Alternate embodiments of the invention contemplate an analog original information signal (101). An analog original information signal (e.g., voice information) would, prior to conversion into QAM-symbols, be converted to a digital form.

Figure 2:
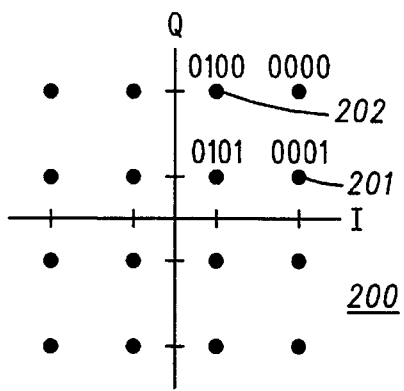
FIG. 2 comprises a depiction of a 16 QAM symbol constellation.

The processing unit (102) functions to convert groups of 16 serial bits of the original information signal into four 16 QAM complex signal points (symbols). For example, FIG. 2 depicts a 16 QAM complex signal symbol constellation (200). Each symbol in the constellation represents a different combination of four serial bits. For example, a first one of these symbols (201) represents the bits "0001." A second symbol (202), on the other hand, represents the bits "0100," all in accordance with well understood prior art methodology.

Figure 3:
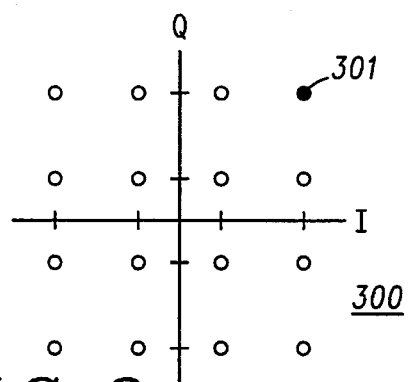
FIG. 3 comprises a depiction of a symbol constellation wherein one of the symbols constitutes a predetermined pilot reference symbol.

For each serially received 16 original information bits, the processing unit (102) outputs, in parallel, on each of 4 signal paths (103–106), an appropriate representative multibit symbol as described above. A pilot insertion unit (107–110), located in each signal path (103–106), inserts a predetermined symbol following receipt of 7 serially received information symbols from the processing unit (102) pursuant to one embodiment of a communication methodology in accordance with tile invention. For example, with reference to the constellation (300) depicted in FIG. 3, the symbol depicted by reference numeral 301 can, by way of example, serve as the predetermined symbol inserted by the pilot insertion unit (107–110). (Other symbols within the constellation could of course be used. Arbitrary signal points not within the constellation could also be used in an appropriate application. Furthermore, although a particular symbol is used to represent the pilot reference in this manner, this does not mean that this same symbol cannot serve as a multibit symbol for other symbol locations in the symbol stream. The preferred embodiment would in fact allow the predetermined symbol to perform this dual function. Lastly, it is not necessary that all of the pilot symbols be identical or spaced in time by a regular, uniform interval; it is only necessary that they be selected in a predetermined way.) As these examples clearly illustrate, the pilot symbols are selected without regard to—i.e., independent of—the original information signal.

Figure 4A:
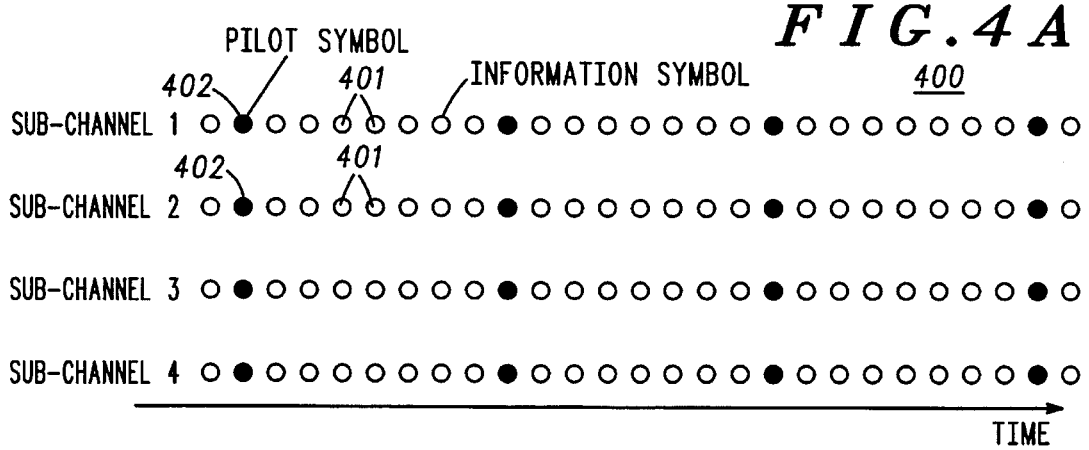
FIGS. 4a–c comprise timing diagrams representative of a series of symbol sequences as provided in various embodiments in accordance with the invention.

The resulting output from the pilot insertion units (107–110) comprises a symbol stream (in this embodiment having a symbol rate of 3.8 kilo symbols per second) that is as generally depicted in FIG. 4a by reference numeral 400. As depicted, a predetermined symbol (402) constituting a pilot reference serially appears following each seven informational data symbols (401). This symbol stream forms a composite signal that includes one non-informational pilot reference symbol for every seven informational data symbols. These composite signals are provided to pulse shaping filters (116–119) that appropriately shape the symbols for transmission.

Thereafter, each composite signal is mixed using mixers (121–124) with an appropriate injection signal (126–129) of the form $e^{(j2\Pi f_{offk}t)}$, wherein j is the square root of negative one, t is time, and $f_{offk}$ comprises an offset frequency corresponding to the kth composite signal. All of the above parameters will be identical for each of the injection signals (126–129) with the exception of the frequency offset value. In this embodiment, the first injection signal (126) has an offset frequency value of 6.27 kHz. The second injection signal (127) has an offset frequency of minus 2.09 kHz. 2.09 kHz comprises the offset frequency for the third injection signal (128), and 6.27 kHz comprises the offset frequency for the fourth injection signal (129).

The filtered and offset composite signals are thereafter combined (131) to form a modulation signal. The real and imaginary parts of this complex modulation signal are separated (132, 133) and provided to a quadrature upconverter (134), following which the signal is amplified (135) and applied to an antenna (136) for transmission, the latter occurring in accordance with well-understood prior art methodology.

Figure 4B:
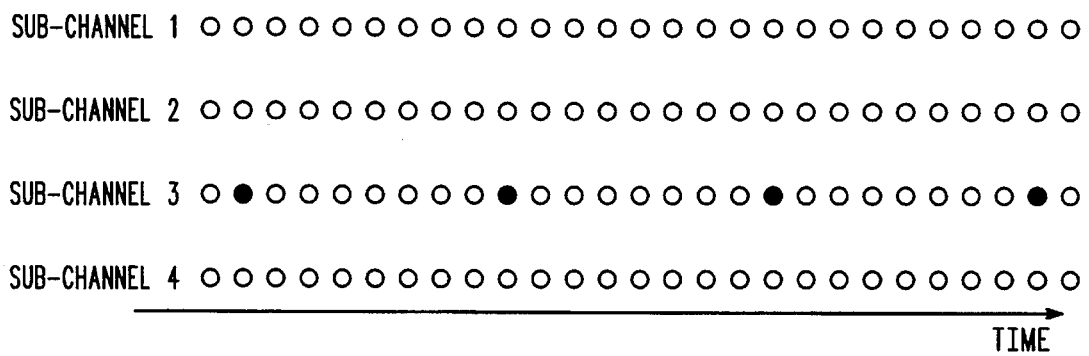

The resultant shaped, frequency offset, and combined 16 QAM symbol sequences are generally represented in FIG. 5 by reference numeral 500. As generally depicted in this spectral diagram, there are four effective sub-channels of symbol information (501), each being offset from the others in correlation to the offset frequencies referred to above. In this embodiment, each subchannel symbol also includes a time domain pilot reference sequence (figuratively represented by reference numeral 502) embedded therein. (It is not necessary that each 16 QAM subchannel symbol of this quad 16 QAM packet include an embedded time domain pilot reference. For example, only one of the QAM signals might include the pilot reference, as illustrated in FIG. 4b, with interpolation techniques being used during reception to provide an estimated pilot reference for use in recovering the remaining 16 QAM subchannels. The filter interpolation technique, later described, may be applied to other pilot sequences as well. For example, FIG. 4D shows a pilot sequence which has both time staggered, and time coincident characteristics, in particular, at times 402, 404, 406, the pilot symbols on subchannel 1 and subchannel 2 are time coincident with each other, while subchannel 3 and subchannel 4 have no pilot symbols. By contrast, at times 405, 407, 409 subchannels 3 and 4 have time coincident pilot symbols, while subchannels 1 and 2 have no pilot symbols. In FIG. 4D, the occurrences of pilot symbol sequences in channels 1 and 2 and the occurrences of pilot sequences in channels 3 and 4 are considered to be mutually exclusive. In a preferred embodiment pilot symbols are inserted, on mutually exclusive subchannel subsets, such as {1&2}, {3&4}, {1&3}, etc. wherein the elements of each subset are mutually exclusive. That is, the present invention contemplates combining the beneficial characteristics of time coincident piloting (e.g., 402), and time-staggered piloting (e.g., piloting at time 405 relative to time 402). In this manner, mutually exclusive subchannel pairs (e.g., subchannels 1 & 2, 3 & 4, etc.) can be utilized to simultaneously enhance time interpolation over all the subchannels and phase/amplitude correction calculations, as later described. It should be further noted that the recurring intervals of these subchannel subsets can be either periodic (as in times 405, 407, 409) or aperiodic (as in times 402, 404, 406), which benefits are also later described.

FIG. 4E shows another grouping or arrangement of subchannel pilot occurrences. A first subset of channels, i.e. 1 and 3, has pilots on channels 1 and 3 at time 411. A second subset of subchannels, i.e. subchannels 1 and 2, have pilots on subchannels 1 and 2 at time 413. A third subset of channels, i.e. channel 3, shows only a single subchannel (4) being piloted at time 415, while time 417 has pilots on the first subset of channels, 1 and 3. (It should be noted that the occurrences of pilots shown in FIG. 4E are aperiodic. Other embodiments would of course include periodic pilots in these subchannels as well.)

Another embodiment of the invention might have time coincident pilot symbols on all 4 subchannels at times 421 and 423, as shown in FIG. 4F. Having several so-called corrective time coincident pilots serves as an excellent point to make phase/amplitude correction calculations, which process is later described.

FIG. 4G shows yet another stream of information-bearing QAM symbols and combined pilot sequences, which might be employed, for example, in a time division multiplex (TDM) system having multislot data frames. Such systems generally make pilot symbols available only for the slot to which the user is assigned, such as when the receiver is cycled on only for the assigned slot (e.g., to save battery power). This limitation on pilot availability has significant implications on pilot interpolation filter design. In particular, use of an interpolation technique having a fixed number of sample points (e.g., fixed number of, pilots per time slot) must properly weight these sample points according to where they are with respect to the data symbol being interpolated. It should be noted that periodically occurring pilot symbols (e.g. as shown on subchannels 2 & 4) are not readily suitable for maintaining a uniform interpolation error across the timeslot. This is due, in part, to the fact that the interpolation mean square error (MSE) tends to be much higher near the ends of the timeslot than in the middle of the timeslot. This non-uniform error across the timeslot degrades the overall carrier recovery performance. By contrast, a periodically spaced pilot symbols (e.g., as shown on subchannels 1 & 3), in concert with appropriate weighting factors, or coefficients, allows the interpolation error to be made substantially uniform across the time slot. (i.e., interpolated values at the beginning, i.e. times 431, 433, and 437, and ends, i.e. times 441, 445, and 447, are substantially as accurate as those in the center (439) of the time slot). That is, by judiciously using additional pilot symbols near the ends of the timeslot, the MSE across the timeslot can be made substantially uniform, thereby providing a significant improvement in the performance of the carrier recovery system. In particular, the time-dependent error contribution is accounted for, thereby making the error across the timeslots substantially independent of symbol location within the timeslot. Further, these coefficients may be stored in memory and indexed according to subchannel and data symbol position, as later described.

Figure 4C:
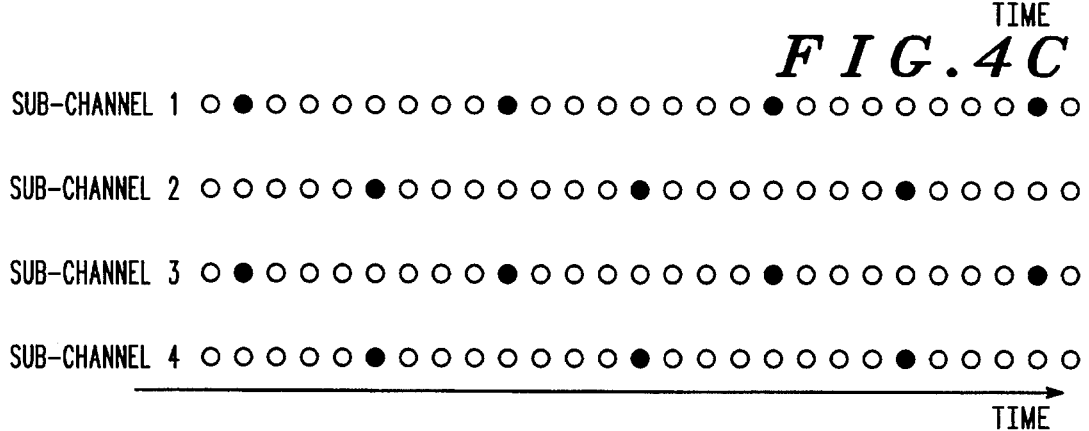

Accordingly, the present invention contemplates pilot symbol sequences which are periodic in nature, as well as aperiodic. Further, subsets of subchannels may be employed, as later described, to provide enhanced pilot channel gain sample corrections, which subsets may or may not be mutually exclusive with alternate subsets. Of particular importance is that the position (the time of occurrence) of the pre-determined pilot symbols is known at each subchannel receiver. With this information, channel gain (which is a complex entity that scales and rotates a transmitted signal and includes the phase and/or amplitude modulation of a signal by the transmission channel) is interpolated over time and/or frequency, and is compensated for by the receiver(s), as necessary for that particular subchannel, to recover the information of interest. Doing so results in an effective pilot rate increase without a corresponding increase in the total number of required pilots (i.e. pilot overhead). In addition, or in the alternative, pilot sequences for the various subchannels might be staggered in time relative to each other, as depicted in FIG. 4c, to allow interpolation over time and frequency of estimated pilot references for use in recovering symbols for all subchannels. What is important is that a plurality of QAM signals be substantially simultaneously provided, in a manner frequency offset from one another, wherein at least one of the QAM signals includes a time domain pilot reference.)

A receiver suitable for use in recovering the above described signal has been set forth in FIG. 6a (600). Following appropriate reception of the transmitted signal as provided by, for example, an antenna (601), preselector (602), and quadrature downconverter (603), a composite signal centered substantially at zero frequency is provided to a bank of subchannel receivers (604*a–d*), for the purpose of recovering the original 16 QAM signals.

Operation of the subchannel receivers is further illustrated in FIG. 6*b*. The composite signal still comprising 4 parallel subchannels is mixed (606) with the appropriate injection signal of the form $e^{(-j2\Pi f_{offs} t)}$, in order to center the desired subchannel at approximately zero frequency (i.e., to remove the frequency offset introduced at the transmitter).

A receiver pulse shaping filter (607) receives this mixed signal and appropriately shapes the received signal and filters out the other subchannel signals and noise to produce a single subchannel signal. A symbol sampler (608) then allows individual symbols to be sampled and provided to both of two processing paths (609 and 610). The first signal processing path (609) includes a pilot sampler (611) that selects the pilot symbols from the composite symbol sequence comprising data and pilot symbols. The pilot samples are then multiplied (612) by the reciprocal (613) of the original transmitted pilot symbol (which is known at the receiver by virtue of having been predetermined), to provide an estimate of the channel gain corresponding to the pilot sampling instant.

A pilot interpolation filter (614) then processes this recovered pilot sequence to obtain an estimate of the channel gain at the intervening data symbol instants. The pilot interpolation filter (614) may be one-dimensional, i.e. for time domain only pilots as shown in FIGS. 4A and 4B, or two-dimensional, i.e. for pilots varying with both time and frequency as shown in FIGS. 4C–G. The operation of the interpolation filter (614), either one- or two-dimensional, may be better understood in consideration of FIG. 4H and the following equation, which shows the interpolation channel gain estimate, $y_{j,m}$, for the $j^{th}$ data symbol on subchannel m:

$$y_{j,m} = \sum_{k \in K_{j,m}} \left[ \sum_{i \in I_k} (c_{i,k,j,m})(p_{i,k}) \right]$$

where:

[$w_{j,m,i,k}$]$c_{i,k,j,m}$=interpolation weighting coefficient for the data symbol at time j of subchannel m using the $i^{th}$ pilot symbol of subchannel k;

$p_{i,k}$=corrected pilot channel gain sample for the $i^{th}$ pilot symbol of subchannel k;

$k_{j,m}$=predetermined subset of subchannels to be used for interpolation for the $j^{th}$ data symbol [at time j] on subchannel m; and $l_k$=predetermined subset of the available corrected pilot channel gain samples for the subchannel denoted by k.

Equation (1) may be implemented in each of the subchannel receivers (604A–604D), one of which receiver is shown in the simplified block diagram of FIG. 6B. As an example, interpolation for the data symbol at time 461 on subchannel 2 is graphically shown in FIG. 4H. It is assumed that this symbol is interpolated over time (i.e. using 3rd and 4th pilots on subchannel 2) and frequency (i.e. using 2nd and 3rd pilots from the adjacent subchannel 1 ). In accordance with the above equation, each of the corrected pilot channel gain sample values ($P_{i,k}$) are weighted (453–456), using the appropriate weighting coefficient ($w_{[i,k],[j,m]}$), and summed (457, 458) for each subchannel. Each of these signals are then summed (459), if appropriate, across subchannels to yield the interpolated channel gain estimate for use in detecting data symbol (461).

Figure 8:
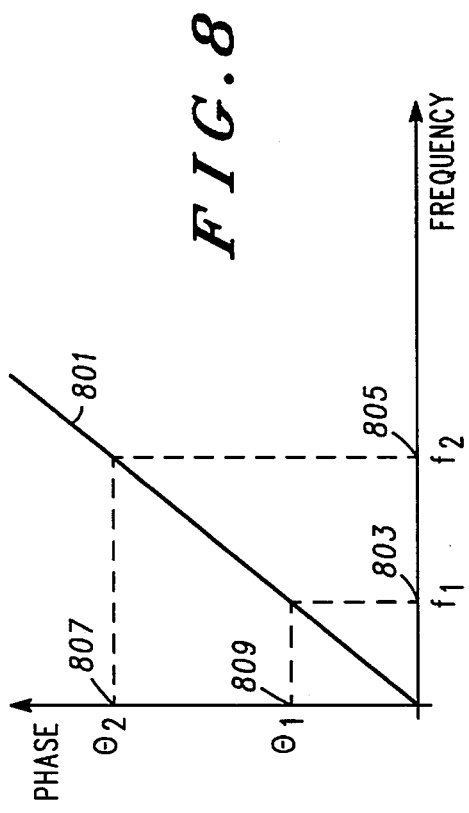
FIG. 8 comprises a graph illustrating phase vs. frequency response characteristics of a preselector filter, as determined in accordance with the invention.

The aforementioned embodiment does not take into account the phase and amplitude differences between the raw pilot symbols taken from different subchannels. Such differences arise due, at least in part, to the phase-versus-frequency response of the preselector filter (602, shown in FIG.6A). That is, since the pilots used for (two-dimensional) interpolation are necessarily taken from subchannels having different frequencies, the effect of this difference in frequency must be removed before the raw pilot data can be used. Namely, the phase and/or amplitude values of the raw pilot symbols taken from other subchannels (i.e. "off-channel") must be corrected to correspond to the subchannel in which the data symbol is being interpolated (i.e. "on-channel"). To illustrate the phase rotation caused by the receiver filtering, FIG. 8 shows a phase vs. frequency response curve 801, for a particular preselector filter. At a frequency $f_1$ (803) the filter causes a phase rotation of $\theta_1$ (809). Similarly, at a frequency $f_2$ (805) the filter causes a phase rotation of $\theta_2$ (807). While the phase vs. frequency response of the filter is shown as being substantially linear, it is anticipated that it could be described by a polynomial of an order higher than 1.

Figure 4H:
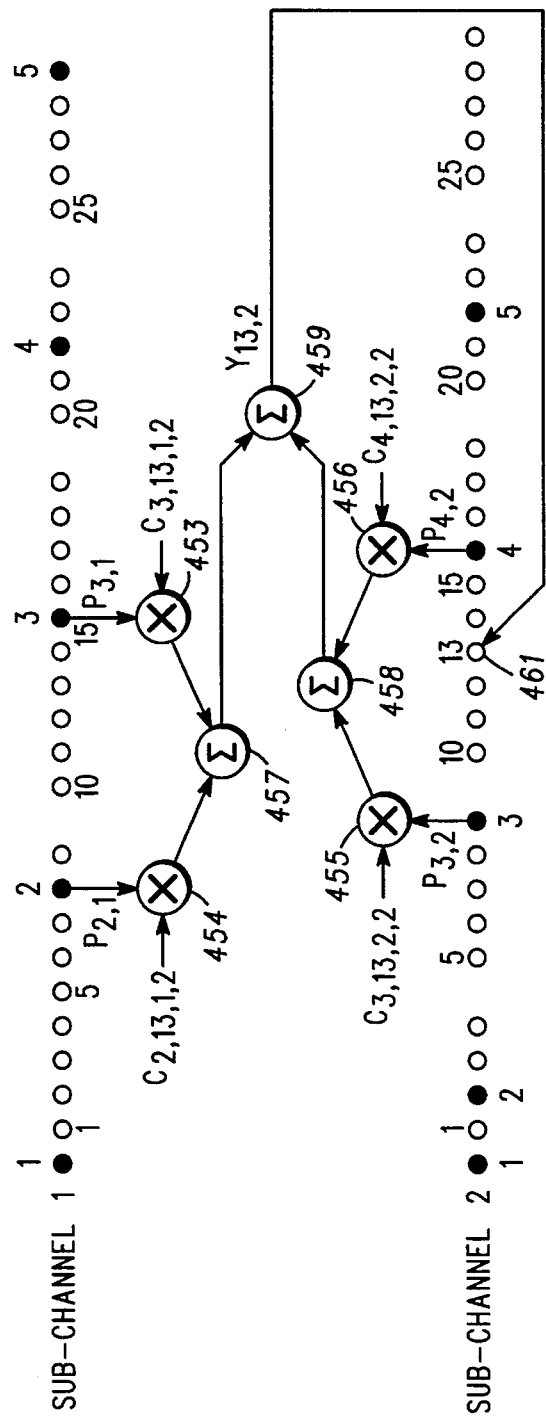
FIG. 4H comprises a graphical representation of how pilot symbols might be used in interpolating data symbols, in accordance with one embodiment of the invention.

In the preferred embodiment, phase and/or amplitude correction factors for the off-channel pilot channel gain samples are calculated and applied to the raw pilot channel gain samples ($p'_{i,k}$ in FIG. 6B) to yield the corrected pilot channel gain samples ($p_{i,k}$). (The corrected pilot channel gain samples are then multiplied by the weighting coefficient ($w_{[i,k],[j,m]}$) as shown in FIG. 4H.) These complex correction factors are calculated for time coincident pairs of pilot samples which will be used in the interpolation for an on-channel data symbol. Mathematically, the raw pilot channel gain samples on subchannels m and subchannel k can be represented in vector form by:

$$p'_{i,m} = \alpha_{i,m} e^{j\theta_{i,m}} \qquad (2)$$

and, $$p'_{i,k} = \alpha_{i,k} e^{j\theta_{i,k}} = \alpha_{i,k} e^{j(\emptyset + \theta_{i,m})} \qquad (3)$$

Equations (2) and (3) show the respective phase and amplitude values for raw pilot channel gain samples transmitted on subchannels m and k, respectively. These raw pilot vectors may be used to interpolate a particular data symbol on subchannel m, while subchannel k is considered to be an "off-channel". In order to determine the phase difference between the on-channel pilots and the off-channel pilots, the product of the on-channel pilot vector and the complex conjugate of the off-channel pilot vector is calculated as follows:

$$\begin{aligned} a &= p'_{i,m} \cdot p'^{*}_{i,k} &= \alpha_{i,m} e^{j\theta_{i,m}} \cdot \alpha_{i,k} e^{-j(\emptyset \theta_{i,m})} \qquad (4)\\ &= \alpha_{i,m} \alpha_{i,k} e^{-j\emptyset} \end{aligned}$$

The phase difference between the two vectors, then is given by arg{a}, i.e.–Ø. In a preferred embodiment, the phase correction factor for each pair of subchannels is derived by calculating the intermediate result, a, for one or more pairs of time coincident raw pilot channel gain samples and then summing these intermediate results to generate an "average" value. The resulting accuracy of the phase correction factor increases as more time coincident pairs are included in this summation.

Similarly, the amplitude ratio (a unitless real quantity, b) can be calculated as:

$$b = \frac{|p'_{i,m}|}{|p'_{i,k}|} = \frac{\alpha_{i,m}}{\alpha_{i,k}} \qquad (5)$$

Thus, the complex correction factor, $c_{k,m}$, which allows using pilots from subchannel k in the interpolation calculations for subchannel m, is given by:

$$c_{k,m} = b \cdot e^{j \cdot arg(a)} = \frac{\alpha_{i,m}}{\alpha_{i,k}} e^{-j\emptyset} \quad (6)$$

In the preferred embodiment, a unique correction factor is calculated for each subchannel pair. This calculation may be made, for example, at a time when all subchannel pilots are time coincident with respect to each other, such as times 421, and 423 in FIG. 4F. The corrected pilot channel gain sample, $p_{i,k}$, is given by the equation:

$$p_{i,k} = c_{k,m} \cdot p'_{i,k} \quad (7)$$

On page 11, line 16, before the word "A", insert the following text:

The pilot channel gain sample (p') is thereby provided for use on other subchannels for frequency domain interpolation, as needed.

On page 11, line 18, after the word "instants.", insert the following text:

In the case of frequency domain interpolation, the pilot interpolation filter (614) also use pilot channel gain values ($p_{i,k}$), as needed, from other subchannels, as shown. Referring to FIG. 6B, it is shown that the pilot interpolation filter (614) has several $p_{i,k}$ signals input to it. The output of the mixer 612 is shown as $p'_{i,k}$ and this output signal is representative of a $p_{i,k}$ input to a pilot interpolation filter of another subchannel receiver (604), as appropriate.

Compensation of channel phase and amplitude distortion and recovery of the original data symbols are carried out as follows. Delay (616) provided in the second processing path (610) serves to time-align the estimated channel gains with the corresponding data symbols, The delayed data symbols are multiplied (617) by the complex conjugates (618) of the estimated channel gains. This operation corrects for channel phase but results in the symbol being scaled by the square of the channel amplitude. This is taken into account in the decision block (619) with appropriate input from a threshold adjustment multiplier (621) that itself utilizes nominal threshold information and a squared representation of the complex channel gain estimate (622).

The symbols received may have suffered degradation due to, for example, phase rotation and/or amplitude variations due to transmission and reception difficulties. By use of information regarding phase and/or amplitude discrepancies and/or effects that can be gleaned from the pilot interpolation filter, however, the symbols as output from the mixer are properly phase compensated. Having been thusly phase compensated, and given the appropriately adjusted decision thresholds as are also provided by the pilot filter, a decision can then be made as to which symbol has been received, and the detected symbol passed on for further processing as appropriate. Such processing would typically include, for example, combining detected symbols from different subchannel receivers, and conversion to a serial format.

Referring to FIG. 7, the function of the pilot interpolation filter (614, shown in FIG. 6B) can be described in more detail. Complex channel gain relative to the overall transmission path can be seen as generally depicted by reference numeral 701. Pilot samples provide information regarding channel gain at the various time instants depicted by reference numeral 702. Based upon this sample information, interpolated channel gain estimates (703) can be made, which channel gain estimates are suitable for use in recovering data samples as described above.

This same methodology could of course be utilized to support transmission and reception of independent information signals that are to be sent in parallel with one another on a carrier. In effect, pursuant to this embodiment, the various subchannels described above would each carry information symbols that are independent of the other subchannels, but wherein the time domain pilot symbol(s) are interpolated over time (and frequency, if desired, as described above) to estimate channel conditions to thereby assist in the proper recovery of the information symbols from the various subchannels.

What is claimed is:

1. A method of transmitting an original information signal, comprising the steps of:

A) converting a serial portion of the original information signal into a parallel plurality of digital information symbols;

B) combining at least one of the parallel plurality of digital information symbols with at least a first predetermined time domain pilot reference symbol to produce at least one composite signal whose constituent symbols occupy temporally separated symbol locations; wherein said at least a first predetermined time domain pilot reference symbol is independent of the original information signal and is positioned such that at least a first information symbol of the symbol stream is temporally separated from the first predetermined time domain reference symbol by greater than one symbol location, and C) mixing each of:
the at least one composite signal; and
those of the parallel plurality of digital information symbols that were not combined with said at least a first predetermined time domain pilot reference symbol; with an offset signal to produce a plurality of offset symbol streams.

2. The method of claim 1, wherein each of:
the at least one composite signal; and
those of the parallel plurality of digital information symbols that were not combined with said at least a first predetermined time domain pilot reference symbol; is mixed with said a different offset signal.

3. The method of claim 1 and further including the step of:

D) combining the plurality of offset symbol streams to provide a modulation signal.

4. A method of transmitting an original information signal, comprising the steps of;

A) converting a serial portion of the original information signal, a parallel plurality of digital information symbols;

B) combining at least two, but not all, of the parallel plurality of digital information symbols with at least a first predetermined time domain pilot reference symbol to produce a at least two composite signals whose constituent symbols occupy temporally separated symbol locations;

wherein said at least a first predetermined time domain pilot reference symbol is independent of the original information signal and is positioned such that at least a first information symbol of the symbol stream is temporally separated from the first predetermined time domain reference symbol by greater than one symbol location; and C) mixing each of:
the at least two composite signals; and those of the parallel plurality of digital information symbols that were not combined with said at least a first predetermined time domain pilot reference symbol;

with an offset signal to produce a plurality of offset symbol streams.

5. The method of claim 4, wherein each of:

the at least two composite signals; and those of the parallel plurality of digital information symbols that were not combine with said at least a first predetermined time domain pilot reference symbol;

is mixed with a different offset signal.

6. The method of claim 4 and further including the step of:

D) combining the plurality of offset symbol streams to provide a modulation signal.

7. A method of receiving a transmitted signal, wherein the transmitted signal comprises a signal formed from an original information signal by the steps of:

A) converting a serial portion of the original information signal into a parallel plurality of processed information signal sample sequences;

B) combining each of the parallel plurality of processed information signal sample sequences a periodically with at least one predetermined sample, wherein said at least one predetermined sample is independent of, the original information signal, to form a plurality of composite signals and wherein each of said at least one predetermined sample serves as a time domain pilot reference;

C) processing the plurality of composite signals; and

D) transmitting the processed composite signals;

the method comprising the steps of:
A) receiving the transmitted signal to produce a received signal;
B) recovering, responsive to the step of receiving, the composite signals from the received signal;
C) recovering, from each of the composite signals, the at least one pilot reference associated therewith;
D) using the at least one recovered pilot reference to recover the original information signal.

8. A method of receiving a transmitted signal, wherein the transmitted signal comprises a signal formed from an original information signal by the steps of:

A) converting a serial portion of the original information signal into a parallel plurality of processed information signal sample sequences;

B) combining at least one of the parallel plurality of processed information signal sample sequences a periodically with at least one predetermined sample, wherein said at least one predetermined sample is independent of the original information signal, to form at least one composite signal, and wherein each of said at least one predetermined sample serves as a time domain pilot reference;

C) processing the at least one composite signal to produce the transmitted signal;

the method comprising the steps of:
A) receiving the transmitted signal to produce a received signal;
B) recovering, responsive to the step of receiving, the at least one composite signal from the received signal;
C) recovering, from the at least one composite signal the pilot reference associated therewith;
D) using the recovered pilot reference to recover the original information signal.

9. The method of claim 8, wherein the step of using the recovered pilot reference to recover the original information signal includes the steps of:

D1) using the recovered pilot reference to recover the original information signal contained in a corresponding one of the parallel plurality of processed information signal sample sequences, which sequence constitutes the sequence that the recovered pilot reference was previously combined with.

10. The method of claim 9, wherein the step of using the recovered pilot reference to recover the original information signal further includes the steps of:

D2) using the recovered pilot reference to recover the original information signal contained in one of the parallel plurality of processed information signal sample sequences, which sequence constitutes a sequence that the recovered pilot reference was not previously combined with.

11. The method of claim 10, wherein the step of using the recovered pilot reference to recover the original information signal contained in one of the parallel plurality of processed information signal sample sequences, which sequence constitutes a sequence that the recovered pilot reference was not previously combined with, includes the step of using the recovered pilot reference to form an estimated pilot reference for use in recovering the original information signal contained in the sequence that was not previously combined with the pilot reference.

12. A method of receiving a transmitted signal, wherein the transmitted signal comprises a signal formed from an original information signal by the steps of:

A) converting a serial portion of the original information signal into a parallel plurality of processed information signal sample sequences;

B) combining at least two, but not all, of the parallel plurality of processed information signal sample sequences a periodically with at least one predetermined sample to form composite signals;

wherein, each of the at least one predetermined sample serves as a time domain pilot reference;

C) processing the composite signals to produce the transmitted signal;

the method comprising the steps of:
A) receiving the transmitted signal to produce a received signal;
B) recovering, responsive to the step of receiving, the composite signals from the received signal;
C) recovering, from the composite signals, the pilot reference associated therewith;
D) using the recovered pilot reference to recover the original information signal.

13. A method of receiving a transmitted signal, wherein the transmitted signal comprises a signal formed from an original information signal by the steps of:

A) converting a first serial portion of the original information signal into a parallel plurality of processed information signal sample sequences;

B) selecting at least one, but not all, of the parallel plurality of processed information signal sample sequences to form a selected sequence;

C) combining each selected sequence with at least one predetermined sample to form composite signals, wherein the predetermined sample comprises a time domain pilot reference;

D) processing the composite signals and unselected sequences to form frequency offset signals;

E) combining the frequency offset signals to form a modulation signal;

F) using the modulation signal to modulate a carrier and thereby form the transmitted signal;

the method comprising the steps of:
A) receiving the transmitted signal to produce a received signal;
B) recovering, responsive to the step of receiving, the composite signals from the received signal;
C) recovering the pilot references from the composite signals to form currently recovered pilot references, and storing information regarding at least some of the currently recovered pilot references;
D) using the currently recovered pilot references to recover the selected sequences that were each previously combined with an associated predetermined sample;
E) using both the currently recovered pilot references and at least some previously stored pilot reference information to form estimated pilot references for use in recovering the unselected sequences that are not combined with an associated predetermined sample;
F) using the recovered selected sequences and unselected sequences to recover an information signal corresponding to the original information signal.

14. A method of transmitting a plurality of original information signals, comprising the steps of:
A) combining at least one of the plurality of original information signals a periodically with at least one predetermined sample, wherein the at least one predetermined sample serves as a time domain pilot reference that is independent of the at least one of the plurality of original information signal;
B) combining the plurality of original information signals with a carrier.

15. The method of claim 14, and further including the step of:
C) transmitting the combined plurality of original information signals and carrier.

16. A method of transmitting an original information signal, comprising the steps of:
A) converting a serial portion of the original information signal into a parallel plurality of digital information signals;
B) during a first period of time, combining each of the parallel plurality of digital information signals with at least one first predetermined sample, which first predetermined samples are all substantially time coincident with one another and which first predetermined samples serve as time domain pilot references;
C) during a second recurring interval, combining at least one of the parallel plurality of digital information signals a periodically with at least one second predetermined sample, at least some of which second predetermined samples are not substantially time coincident with one another and which second predetermined sample serves as a time and frequency domain pilot reference
wherein each of said first and said second predetermined samples are independent of the original information signal.

17. A method of receiving a transmitted signal, wherein the transmitted signal comprises a signal formed from an original information signal by the steps of:
A) converting a serial portion of the original information signal into a parallel plurality of digital information symbols;
B) combining a first subset of said parallel plurality of digital information symbols with predetermined samples, which predetermined samples are substantially time coincident with one another;
C) combining a second subset of said parallel plurality of digital information symbols with predetermined samples, which predetermined samples are not time coincident with one another;
wherein, each of the predetermined samples serve as pilot references;

the method comprising the steps of:
A) receiving the transmitted signal to produce a received signal;
B) recovering responsive to the step of receiving, the composite signals from the received signal;
C) recovering, from each of the composite signals, raw pilot channel gain samples associated therewith;
D) deriving from the raw pilot channel gain samples, amplitude correction factors;
E) producing, from said amplitude correction factors and from the raw pilot channel gain samples, recovered corrected pilot channel gain samples;
F) using the recovered corrected pilot channel gain samples to recover the original information signal.

18. A method of receiving a transmitted signal, wherein the transmitted signal comprises a signal formed from an original information signal by the steps of:
A) converting a serial portion of the original information signal into a parallel plurality of digital information symbols;
B) combining a first subset of said parallel plurality of digital information symbols with predetermined samples, which predetermined samples are substantially time coincident with one another;
C) combining a second subset of said parallel plurality of digital information symbols with predetermined samples, which predetermined samples are not time coincident with one another;
wherein, each of the predetermined samples serve as pilot references;

the method comprising the steps of:
A) receiving the transmitted signal to produce a received signal;
B) recovering, responsive to the step of receiving, the composite signals from the received signal;
C) recovering, from each of the composite signals, raw pilot channel gain samples associated therewith;
D) deriving from the raw pilot channel gain samples, phase correction factors;
E) producing, from said phase correction factors and from the raw pilot channel gain samples, recovered corrected pilot channel gain samples;
F) using the recovered corrected pilot channel gain samples to recover the original information signal.

19. A method of receiving a transmitted signal, wherein the transmitted signal comprises a signal formed from an original information signal by the steps of:
A) converting a serial portion of the original information signal into a parallel plurality of digital information symbols;
B) combining a first subset of said parallel plurality of digital information symbols with predetermined samples, which predetermined samples are substantially time coincident with one another;
C) combining a second subset of said parallel plurality of digital information symbols with predetermined samples, which predetermined samples are not time coincident with one another;

wherein, each of the predetermined samples serve as pilot references;

the method comprising the steps of:
- A) receiving the transmitted signal to produce a received signal;
- B) recovering, responsive to the step of receiving, the composite signals from the received signal;
- C) recovering, from each of the composite signals, raw pilot channel gain samples associated therewith;
- D) deriving from the raw pilot channel gain samples, phase and amplitude correction factors;
- E) producing, from said phase and amplitude correction factors and from the raw pilot channel gain samples, recovered corrected pilot channel gain samples;
- F) using the recovered corrected pilot channel gain samples to recover the original information signal.

20. A method of receiving a transmitted signal, wherein the transmitted signal comprises a signal formed from an original information signal by the steps of:
- A) converting a serial portion of the original information signal into a parallel plurality of digital information symbols;
- B) combining a first subset of said parallel plurality of digital information symbols with predetermined samples, which predetermined samples are substantially time coincident with one another;
- C) combining a second subset of said parallel plurality of digital information symbols with predetermined samples, which predetermined samples are substantially time coincident with one another;

wherein, each of the predetermined samples serve as pilot references;

the method comprising the steps of:
- A) receiving the transmitted signal to produce a received signal;
- B) recovering, responsive to the step of receiving, the composite signals from the received signal;
- C) recovering, from each of the composite signals, raw pilot channel gain samples associated therewith;
- D) deriving from the raw pilot channel gain samples, amplitude correction factors;
- E) producing, from said amplitude correction factors and from the raw pilot channel gain samples, recovered corrected pilot channel gain samples;
- F) using the recovered corrected pilot channel gain samples to recover the original information signal.

21. A method of receiving a transmitted signal, wherein the transmitted signal comprises a signal formed from an original information signal by the steps of:
- A) converting a serial portion of the original information signal into a parallel plurality of digital information symbols;
- B) combining a first subset of said parallel plurality of digital information symbols with predetermined samples, which predetermined samples are substantially time coincident with one another;
- C) combining a second subset of said parallel plurality of digital information symbols with predetermined samples, which predetermined samples are substantially time coincident with one another;

wherein, each of the predetermined samples serve as pilot references;

the method comprising the steps of:
- A) receiving the transmitted signal to produce a received signal;
- B) recovering, responsive to the step of receiving, the composite signals from the received signal;
- C) recovering, from each of the composite signals, raw pilot channel gain samples associated therewith;
- D) deriving from the raw pilot channel gain samples, phase correction factors;
- E) producing, from said phase correction factors and from the raw pilot channel gain samples, recovered corrected pilot channel gain samples;
- F) using the recovered corrected pilot channel gain samples to recover the original information signal.

22. A method of receiving a transmitted signal, wherein the transmitted signal comprises a signal formed from an original information signal by the steps of:
- A) converting a serial portion of the original information signal into a parallel plurality of digital information symbols;
- B) combining a first subset of said parallel plurality of digital information symbols with predetermined samples, which predetermined samples are substantially time coincident with one another;
- C) combining a second subset of said parallel plurality of digital information symbols with predetermined samples, which predetermined samples are substantially time coincident with one another;

wherein, each of the predetermined samples serve as pilot references;

the method comprising the steps of:
- A) receiving the transmitted signal to produce a received signal;
- B) recovering responsive to the step of receiving, the composite signals from the received signal;
- C) recovering from each of the composite signals, raw pilot channel gain samples associated therewith;
- D) deriving from the raw pilot channel gain samples, phase and amplitude correction factors;
- E) producing, from said phase and amplitude correction factors and from the raw pilot channel gain samples, recovered corrected pilot channel gain samples;
- F) using the recovered corrected pilot channel gain samples to recover the original information signal.

* * * * *